United States Patent
Boucher

(10) Patent No.: US 6,702,239 B2
(45) Date of Patent: Mar. 9, 2004

(54) APPARATUS AND METHOD FOR SUPPORTING THE TRUNK OF A TREE

(76) Inventor: Jim R. Boucher, 1616 Freedom Ct., Turlock, CA (US) 95382

( * ) Notice: Subject to any disclaimer, the term of this patent is extended or adjusted under 35 U.S.C. 154(b) by 0 days.

(21) Appl. No.: 10/060,692

(22) Filed: Jan. 29, 2002

(65) Prior Publication Data

US 2003/0205647 A1 Nov. 6, 2003

(51) Int. Cl.7 .............................. A45F 3/44; A01G 17/06
(52) U.S. Cl. .................... 248/156; 248/161; 248/125.8; 248/545; 248/230.8; 47/42; 47/47; 52/157
(58) Field of Search ................................ 248/156, 161, 248/125.8, 176.3, 74.3, 74.5, 530, 545, 230.8, 228.8; 52/157, 165; 47/42, 47; 24/16 PB, 17 AP

(56) References Cited

U.S. PATENT DOCUMENTS

| | | | | | |
|---|---|---|---|---|---|
| 930,792 | A | * | 8/1909 | Perry | 256/47 |
| 2,209,504 | A | * | 7/1940 | Beiter | 248/530 |
| 2,643,843 | A | * | 6/1953 | Brown | 248/156 |
| 3,293,809 | A | * | 12/1966 | Daline | 52/157 |
| 3,688,454 | A | * | 9/1972 | Wolfcarius et al. | 52/103 |
| 3,903,626 | A | * | 9/1975 | Ford | 40/645 |
| 3,903,662 | A | * | 9/1975 | Gabliya et al. | 52/741.14 |
| 4,191,334 | A | * | 3/1980 | Bulanda et al. | 24/16 PB |
| 4,441,679 | A | * | 4/1984 | Calet | 248/156 |
| 4,459,787 | A | * | 7/1984 | Wilcox | 52/155 |
| D287,328 | S | * | 12/1986 | Paul et al. | D8/1 |
| 4,768,741 | A | * | 9/1988 | Logsdon | 248/62 |
| 5,349,780 | A | * | 9/1994 | Dyke | 47/47 |
| 5,457,918 | A | * | 10/1995 | Plourde | 52/165 |
| 5,488,798 | A | * | 2/1996 | Beachel | 43/21.2 |
| 5,546,962 | A | * | 8/1996 | Power | 128/869 |
| 5,833,399 | A | * | 11/1998 | Bullivant | 405/233 |
| D405,662 | S | * | 2/1999 | Evans | D8/1 |
| 5,921,035 | A | | 7/1999 | Kempf | |
| 5,937,488 | A | * | 8/1999 | Geiger | 24/339 |
| 6,199,569 | B1 | * | 3/2001 | Gibson | 135/16 |
| 6,299,125 | B1 | | 10/2001 | Zayeratabat | |
| 6,355,887 | B1 | * | 3/2002 | Gretz | 174/72 A |
| D463,721 | S | * | 10/2002 | Boucher | D8/1 |

OTHER PUBLICATIONS

Decorations for Generations, Inc.; The Reddy Stake System; Directions For Use; Date: Dec. 11, 1997; Two Pages, Turlock, California, U.S.A.

* cited by examiner

Primary Examiner—Leslie A. Braun
Assistant Examiner—Naschica S. Morrison
(74) Attorney, Agent, or Firm—R. Michael West

(57) ABSTRACT

An adjustable-length shaft implanted in the ground for supporting trees. A helical screw is mounted on the lower end of the shaft. A lever arm, passed into a lever fitting attached to the shaft, is rotated about the shaft, causing the helical screw to penetrate and lodge in the ground. An anchoring bracket is attached to a portion of the shaft immediately above the ground. An anchoring rod is driven through the bracket into the ground, preventing further rotation of the shaft. A rigid fastening arm extends outwardly from the upper end of the shaft. The outer end of the fastening arm has a flexible strap with a free end. After adjusting and securing the shaft at the desired height, the free end of the strap is looped around the tree trunk and back through a ratchet mechanism in the fastening arm, which holds the free end fast.

30 Claims, 5 Drawing Sheets

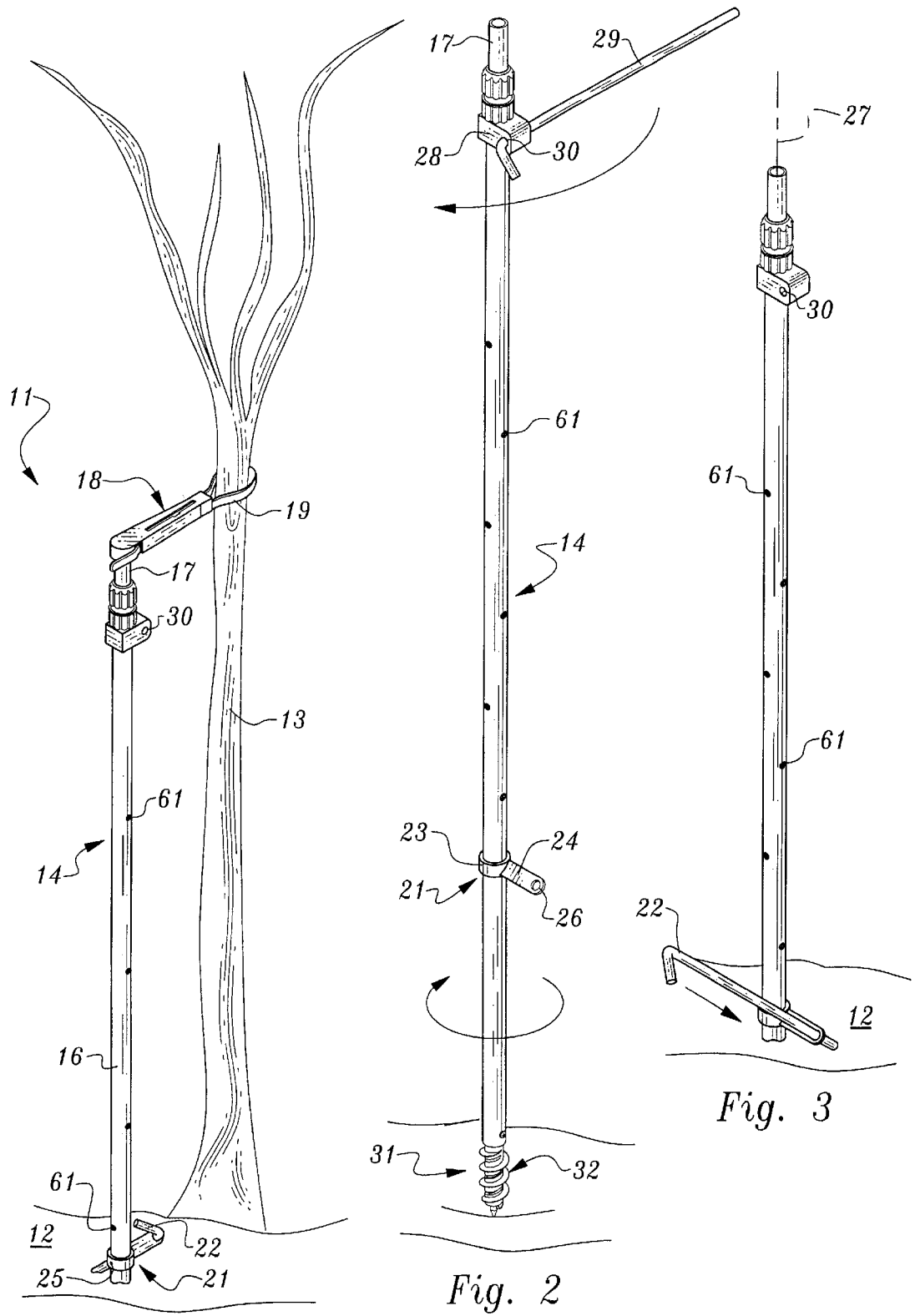

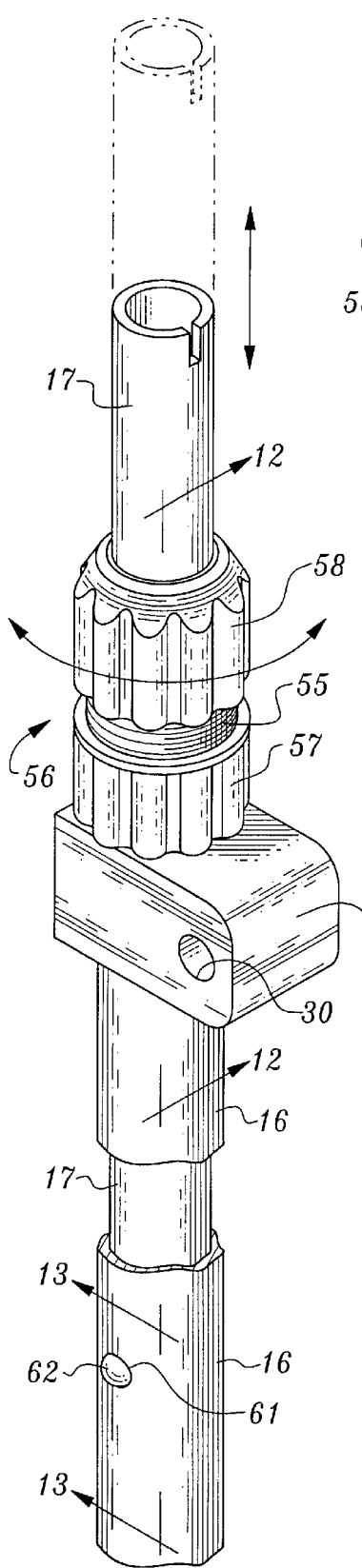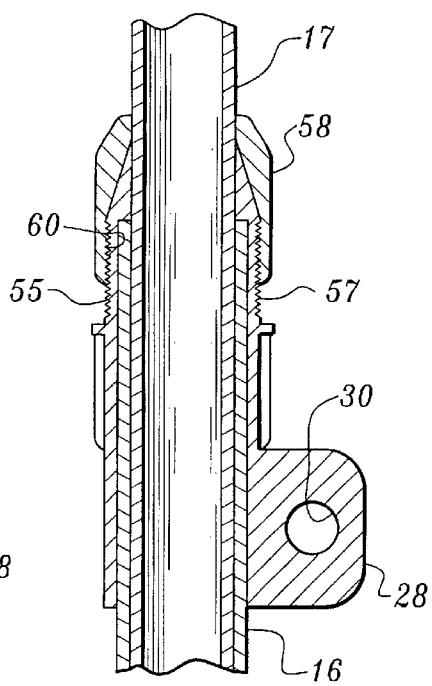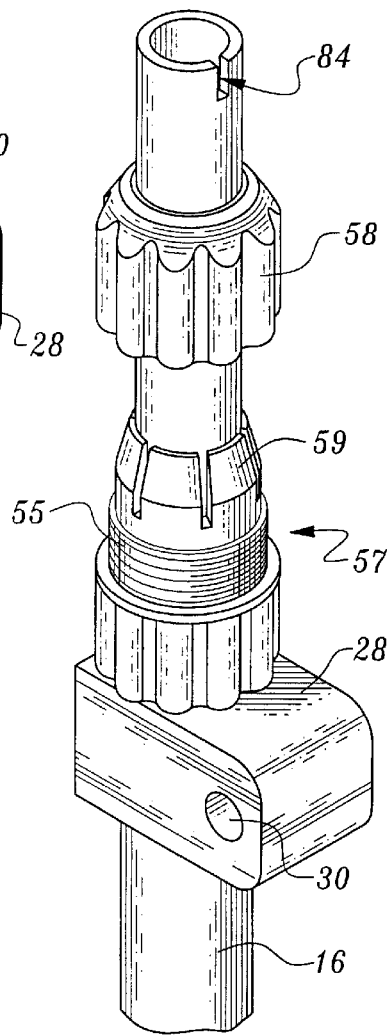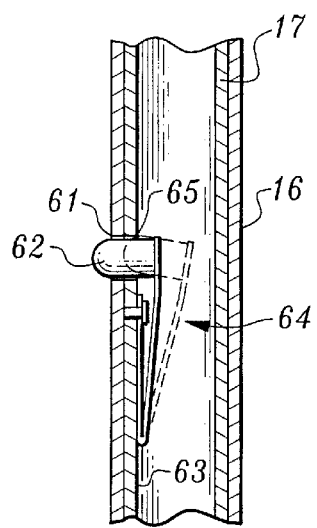
Fig. 10
Fig. 11
Fig. 12
Fig. 13

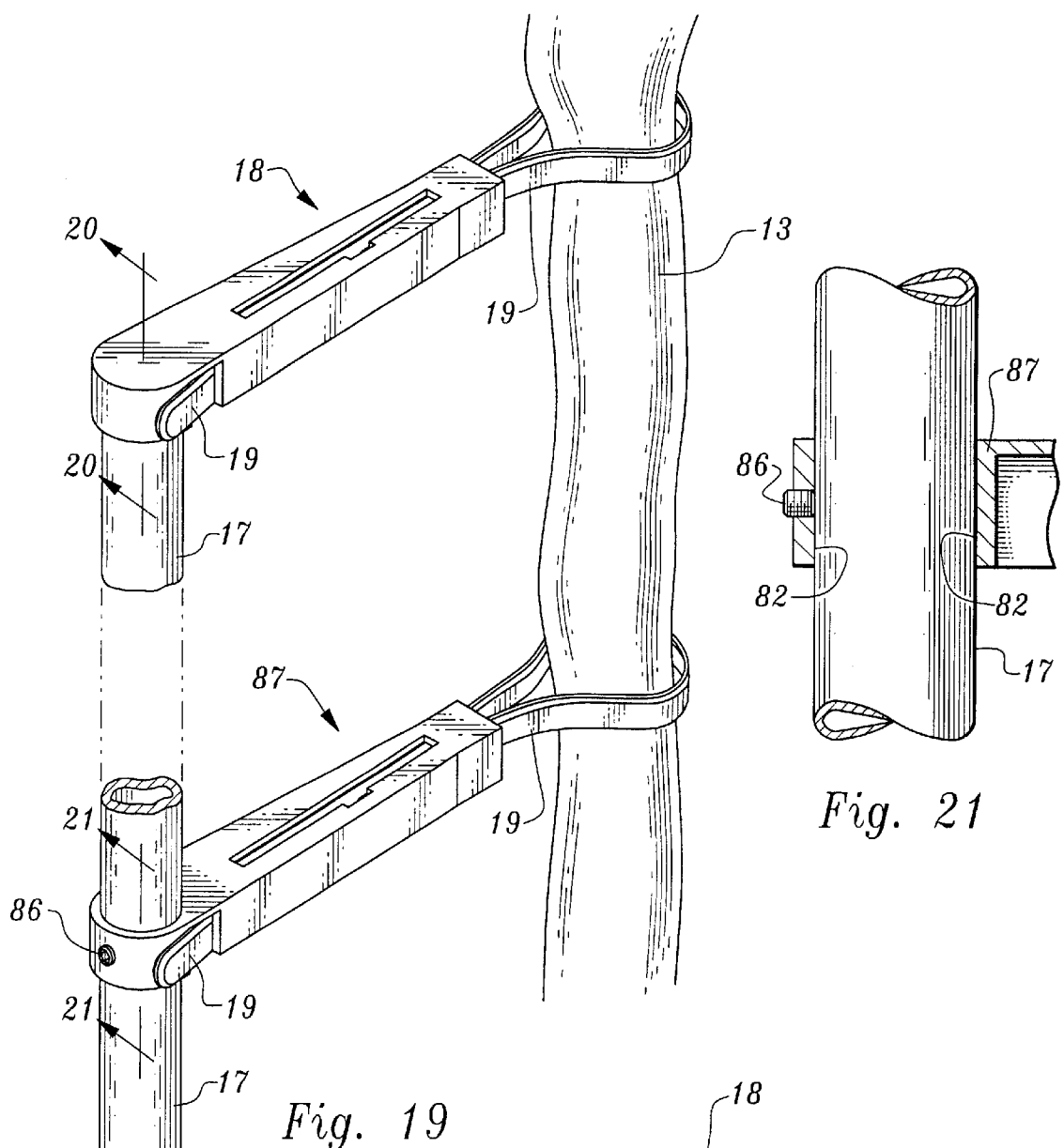
Fig. 19
Fig. 21
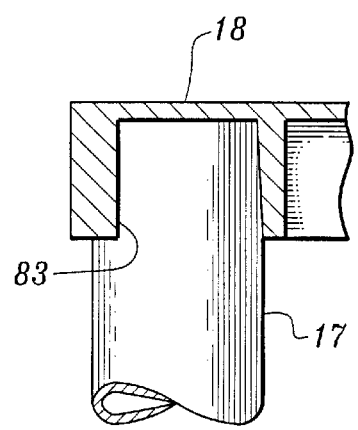
Fig. 20

APPARATUS AND METHOD FOR SUPPORTING THE TRUNK OF A TREE

BACKGROUND OF THE INVENTION

1. Field of the Invention

The invention relates generally to the field of support structures for immature trees. More particularly, the invention pertains to a pole or shaft support for trees which is adjustable in height. The shaft includes a ground-engaging helical screw on its lower end and a tree-engaging fastening arm on its upper end or along its length.

2. Description of Prior Art

The prior art teaches a number of devices for temporarily supporting young trees until they are firmly rooted in the ground and self-supporting. For example, U.S. Pat. No. 5,921,035 to Kempf (the "'035 Patent") discloses a Lockable Screw Post Apparatus having helical coils wrapped around its lower end, and a lockable ground-engaging member parallel to the shaft of the apparatus. The device of the '035 Patent is designed primarily to suspend objects such as a real estate sign, but it may be adapted for use in supporting young trees.

However, the device of the '035 Patent has several drawbacks when employed as a tree support. For example, once implanted, the Kempf device is not adjustable in height. The disclosed device has no fastening mechanism for attachment to a tree. Further, the ground-engaging helical coils are not particularly well adapted to penetrate hard soils. Finally, the lockable ground-engaging member extends into the ground parallel to the shaft, and thus may not adequately prevent unwanted removal of the shaft from the ground by upward pulling forces.

U.S. Pat. No. 6,299,125 to Zayeratabat (the "'125 Patent") discloses a Tree Support Apparatus having a pointed lower end, telescoping stakes, and means for attaching the apparatus to the trunk or stem of a plant or small tree. The apparatus of the '125 Patent also has certain disadvantages. For example, the pointed tip of the lower end will not easily penetrate hardpan or rocky soils. And, the means for attaching the stake to the tree is overly complicated in both assembly and use.

The Reddy Stake™ System installation guide, disclosed in the accompanying Information Disclosure Statement, also shows a device for supporting trees. The Reddy Stake™ device includes an anchoring bar to limit rotational movement of the device when implanted in the ground. The device further includes a T-bar extending from the support pole. Rubber tubing and tie-wraps are used to secure the tree to the T-bar. However, the device is not adjustable in height once implanted in the ground, and the pointed tip of the lower end will not easily penetrate hardpan or rocky soils. Further, the T-bar and rubber tubing connection system is unnecessarily complicated in both assembly and use. Another disadvantage of the device is that the height of the ground-engaging anchoring bar is not adjustable with respect to the support pole. Also, although the T-bar may be adjusted vertically on the pole, any length of the pole extending above the T-bar can potentially gouge and injure the tree. Further, the ground-engaging helical screw coils, at the lower end of the device, are not particularly well adapted to penetrate hard soils.

Thus, the need exists for a simple, efficient, reusable, lightweight, robust and durable apparatus for supporting immature trees in underlying soils of varying hardness. The present invention overcomes the disadvantages of known prior art devices and satisfies the above-recited needs.

The present invention includes a height-adjustable vertical shaft, having a specially-adapted lower end for effective penetration of hard ground. It also has a simple, rigid fastening arm with a ratchet mechanism and an adjustable strap to couple the shaft to the tree. In addition, the invention includes a shaft-anchoring device which penetrates the ground at such an angle so as to prevent both rotational and vertical movement of the shaft.

Therefore, it is an object of the present invention to provide a simple, economical, and reusable device to support dependent, immature trees.

Another object is to provide a height-adjustable tree support that efficiently penetrates and engages a variety of soils.

Still another object is to provide a tree support having an adjustable fastening arm for connecting the tree and the support.

An additional object is to provide a height-adjustable tree support having an adjustable fastening arm, which is attached to the top of the tree support, for connecting the tree and the support.

Yet another object is to provide a tree support including an adjustable-height ground anchor attached to the support shaft to resist rotational and vertical movement of the shaft.

These and other objects of the invention will be explained more fully in the detailed description of the preferred embodiment to follow.

SUMMARY OF THE INVENTION

The present invention provides an apparatus for supporting the trunk of an immature tree, until the tree is sufficiently large and well-rooted to support itself. The apparatus includes an elongated, vertical shaft that is adjustable in length. A lower end of the shaft is fitted with a helical screw, specially adapted for rotational penetration into the ground. The helical screw has a conical tip, followed by a spiral rib section. The rib section resembles the threaded portion of a screw, but is different in that it includes a spiral channel flanked by shelves extending between the channel and the walls of the spiral rib. The combination of the rib and the channel is effective both to penetrate the ground and to remove dislodged soil from the path of the helical screw.

The apparatus also has a rigid fastening arm extending outwardly, in perpendicular fashion, from the shaft. An outer end of the fastening arm has a flexible strap with a free end. The fastening arm has a ratchet mechanism contained within it to secure the free end of the flexible strap. Extending the strap around the tree forms a loop of desired dimension to restrain the tree trunk from excessive lateral excursions.

The apparatus is also provided with an anchoring device to prevent movement of the shaft after it is implanted in the ground. The anchoring device includes an anchoring bracket that is slid down the shaft to the point where it enters the ground. Then, the anchoring bracket is locked to the shaft. The anchoring bracket includes a flange and a collar. The flange has an aperture to receive a ground-engaging rod. The aperture has an axis oriented at an angle not perpendicular to the longitudinal axis of the shaft. Thus, when implanted in the ground through the aperture, the rod is disposed at an angle effective to prevent both rotational movement and vertical movement of the shaft.

Yet another feature of the invention is a lever fitting attached to the shaft to facilitate rotational installation of the shaft into the ground. The lever fitting includes a bore for insertion of a lever arm. The bore has an axis that is laterally displaced and perpendicular to the longitudinal axis of the shaft. Rotational movement of the end of the lever arm thereby provides mechanically-advantaged rotational forces to the shaft and the helical screw on its lower end.

BRIEF DESCRIPTION OF THE DRAWINGS

FIG. 1 is a perspective view of a support apparatus constructed in accordance with the invention, showing the shaft and an anchoring rod implanted in the ground, and the fastening arm encircling a tree trunk;

FIG. 2 is a perspective view of the apparatus, showing the use of a lever arm to facilitate rotational penetration of the shaft into the ground;

FIG. 3 is a perspective view of the apparatus with the anchoring bracket lowered to the ground and locked to the shaft, showing the implantation of the anchoring rod into the ground;

FIG. 10 is a fragmentary perspective view, showing the lever fitting and a compression-locking assembly for securing the upper and lower shaft portions together, the upper shaft portion also being shown in broken-line in an alternate position;

FIG. 11 is a fragmentary perspective view of the shaft, showing the rotatable compression nut in a raised position to reveal the finger segments and threads of the stationary locking ring;

FIG. 12 is a fragmentary, longitudinal, cross-sectional view taken along the line 12—12 in FIG. 10, showing the lever fitting and the compression-locking assembly;

FIG. 13 is a fragmentary, longitudinal, cross-sectional view taken along the line 13—13 in FIG. 10, showing a spring-button locking assembly in both an engaged and a disengaged position;

FIG. 19 is a fragmentary, high-angle, perspective view of the upper shaft portion of the apparatus, showing a fastening arm interconnecting the top of the shaft to a tree trunk, and an alternative embodiment of the fastening arm interconnecting the shaft to the tree trunk at a median location along the shaft, the alternative embodiment further showing a set-screw means for securing the fastening arm to the shaft;

FIG. 20 is a fragmentary, longitudinal, cross-sectional view taken along the line 20—20 in FIG. 19, showing a means for securing the fastening arm to the shaft; and, FIG. 21 is a fragmentary, longitudinal, cross-sectional view taken along the line 21—21 in FIG. 19, showing a set-screw means for securing the alternative embodiment of the fastening arm to the shaft.

DETAILED DESCRIPTION OF THE PREFERRED EMBODIMENT

Figure 4:
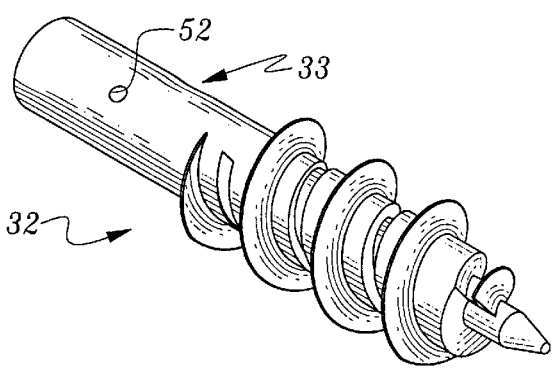
FIG. 4 is a perspective view of a helical screw including a spiral rib and a spiral channel between walls of the rib.
Figures 6, 7:
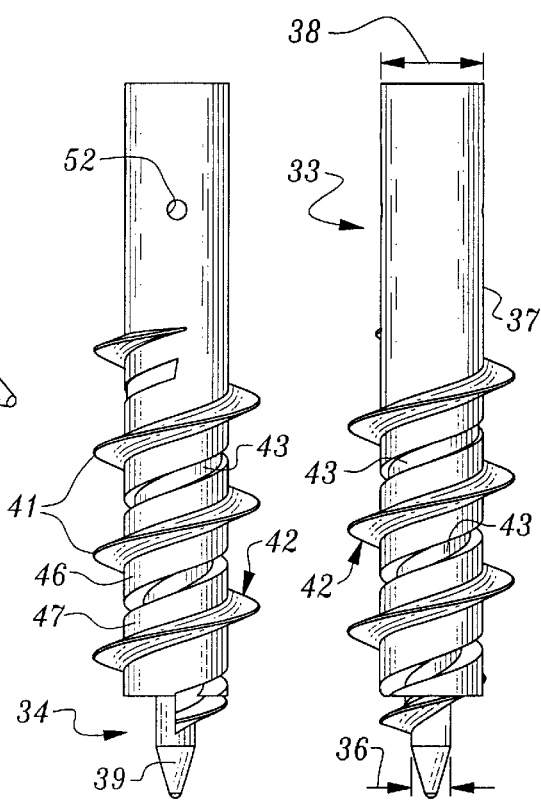
FIG. 6 is a side elevational view of the helical screw.
FIG. 7 is a view as in FIG. 6, but with the helical screw rotated 90 degrees in a clockwise direction around its longitudinal axis, as viewed from above the helical screw.

Turning now to the drawings, FIG. 1 shows a tree-supporting apparatus 11 implanted in the ground 12, supporting an immature tree 13. The apparatus 11 has an elongated shaft 14 that is continuously adjustable in length from a retracted position to an extended position (see FIG. 10). This is accomplished by means of a lower shaft portion 16 being telescopically mated with an upper shaft portion 17. The telescoping function allows the length of the shaft 14 to be adjusted from approximately six feet in its retracted position to approximately nine feet in its fully extended position. The adjustability in the length of the shaft 14 permits the apparatus 11 to be used with trees of various sizes.

Preferably, the shaft 14 is circular in cross-section, but it may be non-circular in cross section without diverging from the scope of the invention. The outer diameter of the upper shaft portion 17 is slightly smaller than the inner diameter of the lower shaft portion 16, permitting the telescoping function. Suitable materials for the shaft 14 include fiberglass, aluminum, plastic, stainless steel, or a composite material. Owing to weight, strength, and durability considerations, the preferred material for the shaft 14 is fiberglass. Additionally, fiberglass combines rigidity with flexibility, which permits a degree of natural movement of the supported tree in windy conditions.

A fastening arm 18, which is described in greater detail below, is shown attached to the upper shaft portion 17. Arm 18 includes a flexible strap 19 secured around the trunk of the tree 13. The apparatus 11 thereby provides lateral support for the tree 13.

The shaft 14 may be anchored in the ground 12 with an anchor bracket 21 and an anchoring rod 22, adapted for penetration of the ground 12. As can be seen in FIG. 2, the anchoring bracket 21 has a collar 23 and a flange 24. The flange 24 extends radially and outwardly from the collar 23. The flange 24 also includes an aperture 26 adapted to receive the anchoring rod 22. The anchoring rod 22 is generally L-shaped. The longer section of the anchoring rod 22 is implanted in the ground 12 through the aperture 26.

As shown in FIG. 3, the flange 24 and aperture 26 are constructed so that when the anchoring rod 22 is inserted through the aperture 26 and implanted into the ground 12, the anchoring rod 22 penetrates the ground 12 at an angle which is not parallel to a longitudinal axis 27 of the shaft 14. It should be noted that the angle of the implanted anchoring rod 22 may be achieved either through the orientation of the flange 24 with respect to the collar 23, or through the orientation of the aperture 26, when it is bored through or cast in the flange 24.

Collar 23 is sized and configured to accommodate the lower shaft portion 16. The anchoring bracket 21 is releasably attached to the lower shaft portion 16, and is adjustable both rotationally and vertically along the lower shaft portion 16. The vertical adjustability of the anchoring bracket 21 allows for secure anchoring of the shaft 14 when the shaft 14 is implanted at variable depths. After the shaft 14 is implanted in the ground 12 to a desired depth, the anchoring bracket 21 is positioned at ground level and secured to the shaft by means of a set screw 25. The anchoring rod 22 is then inserted through the aperture 26 and driven into the ground 12, as shown in FIG. 3. The implanted anchoring rod 22 and anchoring bracket 21 thereby cooperate to resist both rotational and vertical movement of the shaft 14.

FIG. 2 shows the apparatus 11 prior to implantation of the shaft 14 into the ground 12. A lever fitting 28 is provided on the lower shaft portion 16. The lever fitting 28 includes a bore 30. The bore 30 is adapted to receive a lever arm 29 such that the axis of lever arm 29 is laterally displaced from and at a right angle to the longitudinal axis 27 of the shaft 14. A helical screw 32, discussed more fully below, is mounted to a lower end 31 of the shaft 14. Applying a rotational force to the lever arm 29 in the direction shown in FIG. 2 effects penetration of the helical screw 32 and the shaft 14 into the ground 12.

FIGS. 4–9 show detailed features of the helical screw 32. The helical screw 32 has an elongated shank 33 having a lower section 34 of a first diameter 36 and an upper section 37 of a second diameter 38. The second diameter 38 is greater than the first diameter 36. The lower section 34 tapers to form a conical tip 39.

A spiral rib 41 is disposed circumferentially around the shank 33. The spiral rib 41 is similar in configuration to the threads of a screw. The spiral rib 41 has a maximum diameter greater than the second diameter 38, and extends from an upper part of the lower section 34 upwardly over a portion of the upper section 37.

A spiral channel 43 lies between adjacent "threads" of the spiral rib 41. The channel 43 has a progressively increasing depth from a median portion of the upper section 37 to the lower section 34. A first shelf 46 and second shelf 47 lie on either side of the channel 43. The shelves 46 and 47 extend between the channel 43 and a wall 42 of the adjacent spiral rib 41. Suitable materials for the helical screw 32 include aluminum, stainless steel, or composite. The preferred material for the helical screw 32 is cast aluminum.

The cooperative relationship among the channel 43, shelves 46, 47, and spiral rib 41 enhances the penetrating effectiveness of the helical screw 32. This is particularly true in dense or compacted ground, where soil dislodged by the lower section 34 is broken up and transported upwardly by the upper screw and channel elements.

Figure 5:
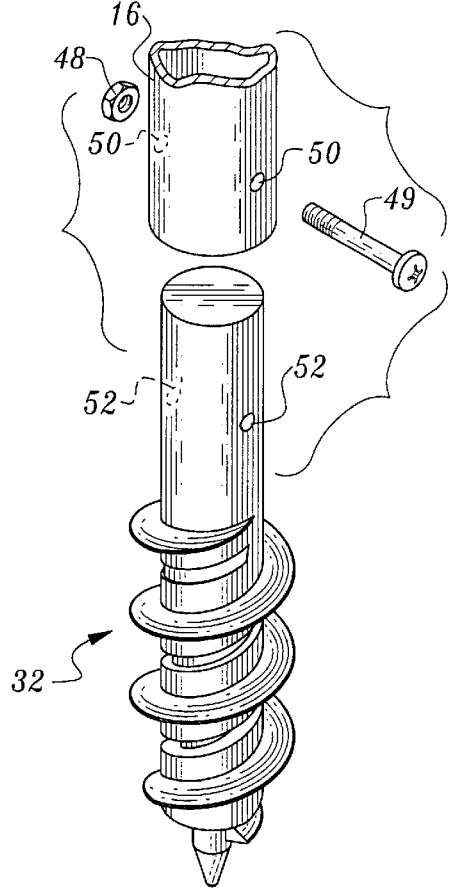
FIG. 5 is a perspective view of the helical screw showing a nut-and-bolt connection between the helical screw and the lower end of the shaft.
Figures 8, 9:
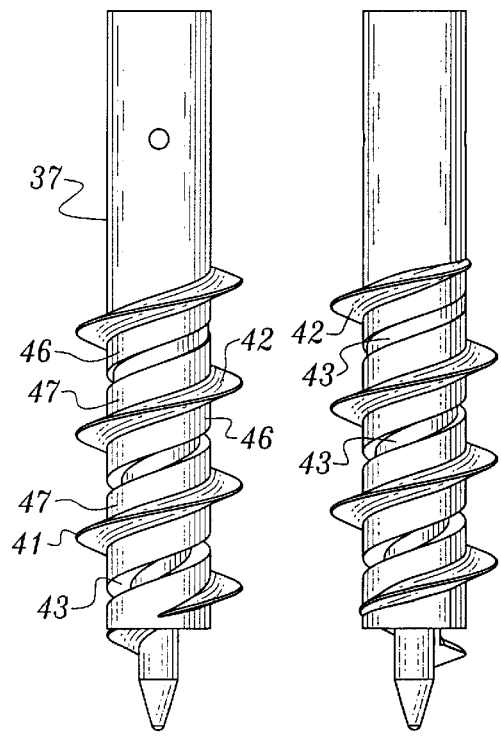
FIG. 8 is a view as in FIG. 6, but with the helical screw rotated 180 degrees in a clockwise direction around its longitudinal axis, as viewed from above the helical screw.
FIG. 9 is a view as in FIG. 6, but with the helical screw rotated 270 degrees in a clockwise direction around its longitudinal axis, as viewed from above the helical screw.

As shown in FIG. 5, the helical screw 32 is secured to the lower shaft portion 16 with a nut 48 and a bolt 49. The lower shaft portion 16 has diametrically opposed shaft bores 50, sized to pass bolt 49. Similarly-sized shank bores 52 are provided in the upper section 37 of the shank 33. The shank 33 fits within the lower shaft portion 16. When the shank bores 52 are aligned with the shaft bores 50, the bolt 49 is inserted through the shaft bores 50 and the shank bores 52. Tightening the nut 48 onto the threaded portion of the bolt 49 secures the shank 33 to the lower shaft portion 16. Pop rivets may also be used in lieu of the nut and bolt attachment system. Alternatively, the helical screw 32 and the lower shaft portion 16 may be integrally formed, entirely eliminating the need for joining structures.

FIGS. 10–13 show detailed views of the telescoping lower shaft portion 16 and upper shaft portion 17. Also disclosed are several arrangements for selectively locking the lower shaft portion 16 and the upper shaft portion 17 into one of a plurality of telescoping positions. In particular, FIG. 10 shows the upper shaft portion 17 being slidable within the lower shaft portion 16. A compression-locking assembly 56, having a stationary locking ring 57 and a compression nut 58, holds the upper shaft portion 17 in a fixed position relative to the lower shaft portion 16, when the compression nut 58 is rotated in clockwise fashion.

As illustrated in FIGS. 11 and 12, the stationary locking ring 57 is attached to the lower shaft portion 16 and includes a plurality of tapering finger segments 59. The compression nut 58 fits over the stationary locking ring 57. The stationary locking ring 57 has threads 55 on its outer wall which are engaged by threads 60 on the inner wall of the compression nut 58.

Rotating the compression nut 58 onto the stationary locking ring 57 in a clockwise direction (see FIG. 10) causes the finger segments 59 to compress around the circumference of the upper shaft portion 17, securing shaft portions 16 and 17 together through friction. Conversely, rotating the compression nut 58 in a counter-clockwise direction decreases the frictional engagement between finger segments 59 and the upper shaft portion 17, thereby allowing the upper shaft portion 17 to slide within portion 16.

Yet another structure is disclosed herein, for securing the lower shaft portion 16 and the upper shaft portion 17 into a selected telescopic relationship. Mounted on an inner wall 63 of the lower end of shaft portion 17 is a spring-button locking assembly 64 (see FIG. 13). The locking assembly 64 has a spring-button 62 that extends through an aperture 65 in the wall 63. The lower shaft portion 16 is provided with a plurality of holes 61, adapted to receive the spring-button 62. As shown in FIG. 13, the spring-button 62 engages one of the holes 61 in the lower shaft portion 16 to secure the upper shaft portion 17 to the lower shaft portion 16. Manually depressing the spring-button 62 disengages it from a hole 61, thereby allowing the upper shaft portion 17 to be rotated or telescopically adjusted with respect to the lower shaft portion 16.

The compression-locking assembly and the spring-button locking assembly may be used either in conjunction or separately. The compression locking assembly could be used separately while making rough telescopic height adjustments of the shaft 14. Then, after an appropriate height is selected, the user may elect to use the spring-button locking assembly for a more positive locking engagement between the shaft portions.

Returning now to FIG. 1, a fastening arm 18 is attached to the upper shaft portion 17. As shown more particularly in FIG. 14, fastening arm 18 has a rigid housing 66 having a proximate end 67 and a distal end 68. Preferably, arm 18 is injection molded from plastic.

Flexible strap 19 has a first end 69, attached to the distal end 68 of the housing 66. The distal end 68 is provided with an entry slot 72 adapted to pass a second end 73 of the strap 19. The second end 73 of the strap 19 includes a plurality of notches 76 on an inner side of the strap 19. Suitable materials for the strap 19 include nylon, leather, hard rubber, plastic, cloth, or other flexible and strong material. It should be noted that the strap 19 may be formed of more than one layer of the same, or dissimilar, materials, to provide the desired strength, flexibility, and durability.

Figure 16:
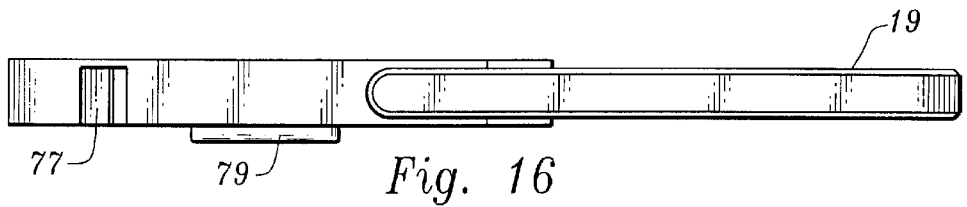
FIG. 16 is a side elevation view of the fastening arm showing the strap, an exit slot for the strap, and a release tab for the ratchet mechanism.

A resiliently biased ratchet 74 is provided in housing 66. A release tab 79 is connected to the ratchet 74 and extends below the bottom surface plane of the housing 66 (see FIG. 16). When the second end 73 of the strap 19 is inserted through the entry slot 72, it contacts the ratchet 74. With further advancement of the strap 19, the ratchet 74 engages a notch 76. When engaged, the ratchet 74 prevents withdrawal of the strap 19 from the housing, while allowing further advancement of strap 19 into the housing 66. An exit slot 77 may be provided along a side of the housing 66. Slot 77 is included to pass the second end 73 of the strap 19 when the strap is nearly fully inserted. Alternatively, a user may simply cut off any excess length of the strap 19, thereby obviating the need for exit slot 77.

In attaching the fastening arm 18 to a tree (see FIG. 19), the strap 19 is looped around the trunk of a tree 13, inserted through the entry slot 72, through the ratchet 74, and then out the exit slot 77, as necessary. The notches 76, ratchet 74, and exit slot 77 cooperate to permit the length of the strap 19 encircling the tree 13 to be adjusted to accommodate trees having varying trunk sizes. It should be noted that the fastening arm 18 has no loose parts, and no tools are required to attach the fastening arm 18 to the tree.

Figure 17:
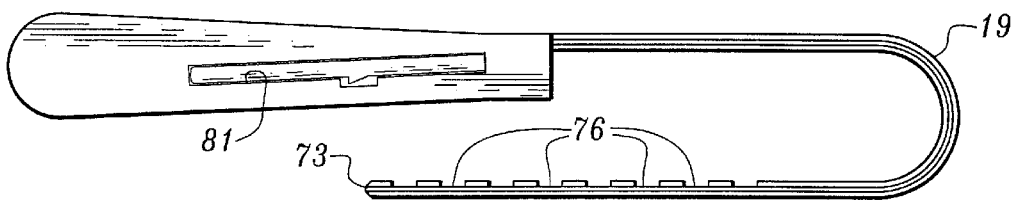
FIG. 17 is a top plan view of the fastening arm showing the strap in a disengaged position and an opening providing access to the ratchet mechanism.
Figure 18:
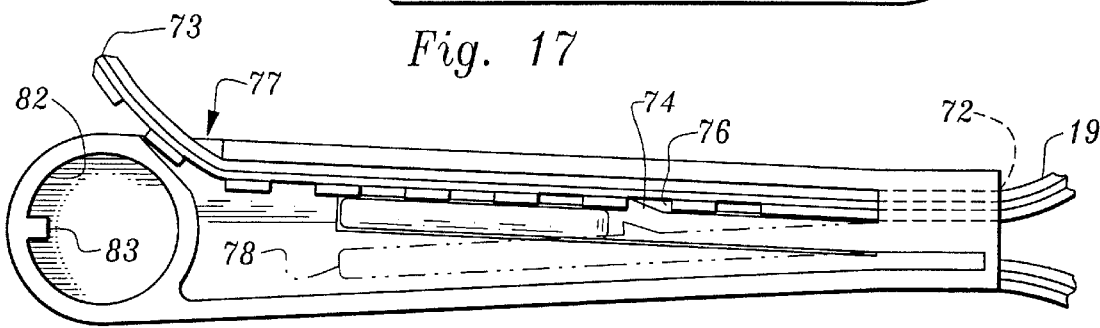
FIG. 18 is a fragmentary, bottom plan view of the fastening arm, showing the strap engaged in the ratchet mechanism, with the free end of the strap extending through the exit slot in the fastening arm, and also showing the ratchet mechanism in broken-line in an alternate, disengaged position.

As shown in FIG. 18, by manually pushing the release tab 79 away from the engaged strap 19, the ratchet 74 may temporarily be moved to a position disengaged from the notches 76. In disengaged position 78, the strap 19 can be adjusted or removed from the ratchet 74. By releasing the release tab 79, the ratchet 74 will automatically spring back to its normal position. An elongated opening 81 (see FIG. 17) on the top surface of the housing 66 allows access to the ratchet 74 and strap 19 from above the fastening arm 18.

Figure 14:
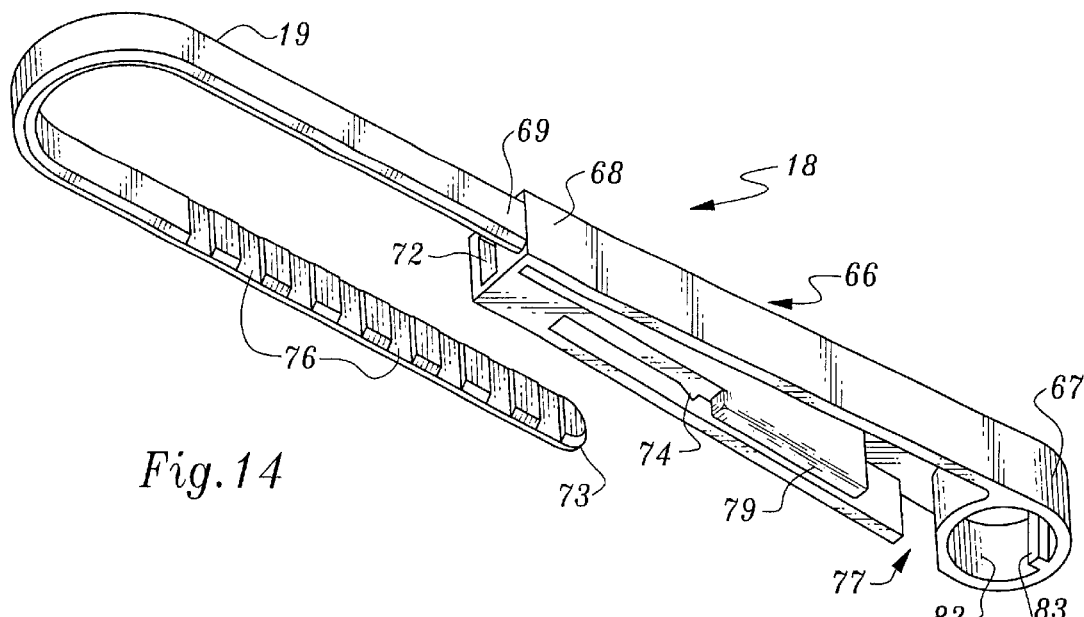
FIG. 14 is a low-angle perspective view of a fastening arm, showing the housing, a flexible strap, a ratchet mechanism, an exit slot for the strap, and a bore to receive the shaft.
Figure 15:
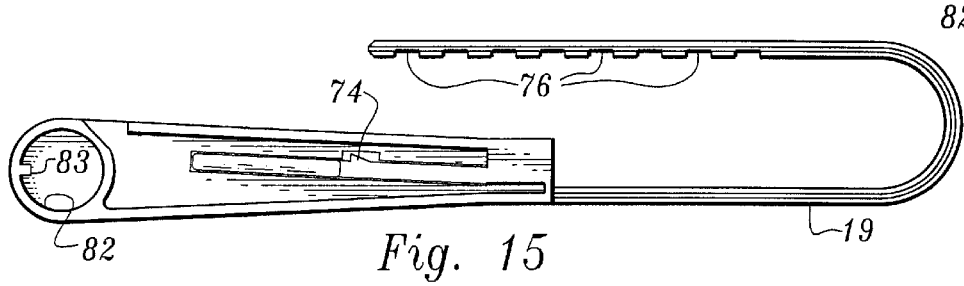
FIG. 15 is a bottom plan view of the fastening arm.

As shown in FIGS. 14, 15 and 18, an arm bore 82 is provided at the proximate end 67 of the housing 66. Bore 82 is sized and configured to receive the upper shaft portion 17. As shown in FIG. 1, the arm bore 82 is positioned on the top of the upper shaft portion 17.

The arm bore 82 includes a key 83, extending inwardly and radially from its side wall. The key 83 cooperates with a groove 84 in the top of the upper shaft portion 17. Proper engagement of the key 83 in the groove 84 prevents rotational movement of the fastening arm 18 in relation to the upper shaft portion 17.

In addition, the arm bore 82 may be provided with an upwardly and inwardly tapering inner diameter. As a consequence, when the fastening arm 18 is properly placed on the upper shaft portion 17 and a nominal downward force is applied, friction between the upper shaft portion 17 and the arm bore 82 securely holds the fastening arm 18 in position. Other equivalent pin and compression locking mechanisms, well known to those of ordinary skill in the art, may be substituted for the disclosed arrangements.

FIG. 19 also shows an alternative construction, including a fastening arm 87 in which the arm bore 82 extends completely through the housing 66. The arm bore 82 in this alternative construction has a constant diameter and does not include a key 83. Rather, the fastening arm 87 uses a set-screw 86 to secure the fastening arm 87 at a desired vertical elevation, and rotational position, on the upper shaft portion 17. Except for the above-described differences, the fastening arm 87 is identical to the fastening arm 18. It should be noted that multiple fastening arms may be secured to the same shaft to provide additional support for a tree, or for multiple trees in adjacent locations.

Properly installing the tree-supporting apparatus 11 is straightforward. First, the lower end 31 of the elongated shaft 14 is placed on the ground 12 at a selected location adjacent one or more trees. Downward and rotational forces are applied to the shaft to rotate the lower portion of shaft 14 into the ground 12 to a desired depth. This force may be applied using a lever arm 29 installed through the lever fitting 28, attached to the shaft 14.

Next, the shaft 14 is extended upwardly, as necessary, by adjusting the telescoping upper shaft portion 17. The upper shaft portion 17 is then secured in this position by means of the compression-locking assembly 56, the spring-button locking assembly 64, or both.

Once the upper shaft portion 17 is secured, the fastening arm 18 is attached and secured to the upper shaft portion 17. The fastening arm 18 is secured to the upper shaft portion 17 using the key 83 and groove 84 combination, or the set-screw 86, as appropriate. It should be noted that if the key 83 and groove 84 combination is employed, minor rotational adjustment of the shaft 14 may be necessary to orient the fastening arm 18 toward the tree 13. The second end 73 of the flexible strap 19 is then looped around the trunk of the tree 13 and inserted through the entry slot 72, the ratchet 74, and out the exit slot 77, as necessary.

To anchor the apparatus 11 in the ground 12 more securely, the anchoring rod 22 is inserted through the aperture 26 in the anchoring bracket 21. Pounding forces are applied to the anchoring rod 22, in the direction shown in FIG. 3, so that the anchoring rod 22 is driven into the ground 12 at an angle not parallel to the longitudinal axis 27 of the shaft 14. The anchoring bracket 21 is then secured to the lower shaft portion 16 by means of a set-screw, or similar attachment method, to prevent movement of the anchoring bracket 21.

What is claimed is:

1. An apparatus for supporting the trunk of a tree, comprising:

a. an elongated shaft, said shaft being continuously adjustable in length from a retracted position to an extended position;

b. means for rotationally implanting a lower end of said shaft into the ground; and c. a fastening arm for interconnecting said shaft to the tree trunk, said fastening arm including: an elongated rigid housing having a proximate end and a distal end, said elongated rigid housing including means for attaching said proximate end of said rigid housing to said shaft so that said housing extends perpendicularly therefrom, said means for attaching further including means for preventing rotation of said housing relative to said shaft, and said distal end adapted to be maintained in spaced relation from the tree trunk; a flexible strap having a first end and a second end, said first end being attached to said distal end of said housing; and, means for releasably securing said second end of said strap within said housing, thereby forming a loop which is adapted to loosely encompass the tree trunk.

2. An apparatus as in claim 1, in which said shaft is telescopic, having a lower shaft portion and an upper shaft portion.

3. An apparatus as in claim 2, including an anchoring bracket releasably attached to said lower shaft portion, and further including an anchoring rod adapted for penetration of the ground, said anchoring bracket having a collar adapted to receive said lower shaft portion and a flange extending radially outward from said collar, said anchoring bracket being adjustable rotationally and vertically along said lower shaft portion, said flange further including an aperture adapted to receive said anchoring rod, said aperture having an axis oriented at an angle which is not parallel to and does not intersect a longitudinal axis of said lower shaft portion, said anchoring rod cooperating with said anchoring bracket to resist rotational movement of said shaft within the ground when said anchoring rod is implanted in the ground.

4. An apparatus as in claim 1, further including means for applying rotational and downward force to said shaft.

5. An apparatus as in claim 4 in which said means for applying rotational and downward force comprises a lever fitting secured to said shaft and a lever arm extending from said lever fitting, said lever arm having an axis that is laterally displaced from and at a right angle to a longitudinal axis of said shaft.

6. An apparatus as in claim 1 in which said means for rotationally implanting said lower end of said shaft comprises a helical screw.

7. An apparatus as in claim 6 in which said helical screw has a lower section of a first diameter and an upper section of a second diameter, said second diameter being greater than said first diameter.

8. An apparatus as in claim 6 in which said helical screw includes an elongated shank provided with a spiral rib and a spiral channel, said spiral channel being substantially co-extensive with said spiral rib and formed within an outer surface of said shank, said spiral channel lying along a path located between adjacent threads of said spiral rib.

9. An apparatus as in claim 8 in which said spiral channel has a progressively increasing depth from said upper section to said lower section.

10. An apparatus as in claim 8, further including first and second shelves lying along either side of said spiral channel, said shelves extending between said spiral channel and a wall of an adjacent said rib.

11. An apparatus for supporting the trunk of a tree, comprising:
   a. an elongated shaft, said shaft having a lower shaft portion and an upper shaft portion, said upper shaft portion being telescopically mated with said lower shaft portion and slidably adjustable therewith;
   b. a fastening arm attached to and extending perpendicularly from an upper end of said upper shaft portion, said arm including an elongated rigid housing and a flexible strap, said housing having a proximate end and a distal end, said proximate end being provided with an arm bore having a rigid surface capable of receiving said upper end of said upper shaft portion and further being provided with means for preventing rotation of said housing relative to said upper shaft portion, and said distal end adapted to be maintained in spaced relation from the tree trunk, said flexible strap having a first end attached to said distal end of said rigid housing and a second end that is free, said arm further including a ratchet mechanism to secure said second end of said flexible strap to said rigid housing, forming a loop which is adapted to loosely encompass the tree trunk; and
   c. a helical screw mounted on a lower end of said lower shaft portion, said helical screw having an axis coincident with a longitudinal axis of said lower shaft portion.

12. An apparatus as in claim 11 in which said helical screw has a lower section of a first diameter and an upper section of a second diameter, said second diameter being greater than said first diameter, said lower section tapering to form a conical tip to facilitate penetration of said helical screw into the ground, said helical screw further including a spiral rib having a diameter greater than said second diameter, said spiral rib extending from an upper part of said conical tip upwardly over a portion of said helical screw, said helical screw further including a spiral channel, said spiral channel being substantially co-extensive with said spiral rib and lying along a path located between adjacent threads of said spiral rib, said channel having a progressively increasing depth from a median portion of said upper section to said lower section, said helical screw further including first and second shelves lying along either side of said spiral channel, said shelves extending between said spiral channel and a wall of an adjacent said rib.

13. An apparatus as in claim 11, further including an anchoring bracket releasably attached to said lower shaft portion, and further including an anchoring rod adapted for penetration of the ground, said anchoring bracket having a collar adapted to receive said lower shaft portion and a flange extending radially outward from said collar, said anchoring bracket being adjustable rotationally and vertically along said lower shaft portion, said flange further including an aperture adapted to receive said anchoring rod, said aperture having an axis oriented at an angle which is not parallel to and does not intersect a longitudinal axis of said lower shaft portion, said anchoring rod cooperating with said anchoring bracket to resist rotational movement of said shaft within the ground when said anchoring rod is implanted in the ground.

14. An apparatus as in claim 13, further including a lever fitting secured to said shaft, said lever fitting adapted to receive a lever arm, said lever arm having an axis that is laterally displaced from and at a right angle to a longitudinal axis of said shaft.

15. An apparatus as in claim 11, further including a lever fitting secured to said shaft, said lever fitting adapted to receive a lever arm, said lever arm having an axis that is laterally displaced from and at a right angle to a longitudinal axis of said shaft.

16. An apparatus as in claim 11, further including means for securing said lower shaft portion and said upper shaft portion in one of a plurality of slidable positions.

17. A fastening arm for interconnecting a ground engaging vertical support with an adjacent tree trunk, comprising:
   a. an elongated rigid housing having a proximate end and a distal end;
   b. a flexible strap having a first end and a second end, said first end being attached to said distal end of said housing;
   c. said elongated rigid housing having a means for attaching said proximate end of said rigid housing to the support, said means for attaching further including a means for preventing rotation of said housing relative to the support, the longitudinal axis of said housing being maintained in perpendicular relation to a vertical axis of the support and said distal end of said housing adapted to be maintained in spaced relation from the tree trunk; and
   d. means for releasably securing said second end of said strap within said housing, thereby forming a loop which is adapted to loosely encompass the tree trunk.

18. An apparatus as in claim 17 in which said distal end of said housing is adapted to slidably receive said second end of said strap.

19. An apparatus as in claim 17 in which said means for releasably securing said strap comprises a ratchet.

20. An apparatus as in claim 19 in which said strap contains a plurality of notches for engagement by said ratchet.

21. An apparatus as in claim 19, in which said ratchet is movable to a disengaged position, to permit adjustment and removal of said second end of said strap from said housing.

22. A fastening arm for interconnecting a ground engaging vertical support with a tree trunk, comprising:
   a. a rigid housing having a proximate end and a distal end, said rigid housing including means for attaching said proximate end thereof to the vertical support so that said housing extends perpendicularly therefrom, said means for attaching further including a means for preventing rotation of said housing relative to the support, and said distal end adapted to be maintained in spaced relation from the tree trunk;
   b. a flexible strap having a first end, a second end, and a plurality of notches on at least one side of said strap between said ends, said first end being attached to said distal end of said housing, said second end being adapted to pass through a slot in said distal end of said housing, whereby said strap forms a loop which is adapted to loosely encompass the tree trunk; and
   c. a ratchet within said housing adapted to engage said notches on said strap and prevent movement of said strap in a direction from said proximate end toward and through said distal end of said housing, while allowing movement of said strap in a direction from said distal end toward and through said proximate end of said housing, said ratchet being selectively releasable to permit adjustment and removal of said second end of said strap from said housing.

23. An apparatus as in claim 22, in which said attaching means comprises an arm bore having a rigid surface extending partially through said proximate end of said housing, said bore being adapted to receive the vertical support.

24. An apparatus as in claim 22, in which said attaching means comprises an arm bore having a rigid surface extending completely through said proximate end of said housing, said bore being adapted to receive the vertical support.

25. A helical screw, comprising:
   a. an elongated shank having a lower section of a first diameter and an upper section of a second diameter, said second diameter being greater than said first diameter, said lower section tapering to form a conical tip to facilitate penetration of said helical screw into the ground;
   b. a spiral rib disposed circumferentially around said shank, said spiral rib having a diameter greater than said second diameter, said spiral rib extending from an upper part of said conical tip upwardly over a portion of said upper section of said shank;
   c. a spiral channel, said spiral channel being substantially co-extensive with said spiral rib and formed within an outer surface of said upper section of said shank, said channel extending along a path located between adjacent threads of said spiral rib, and said channel having a progressively increasing depth from a median portion of said upper section to said lower section, whereby the outer surface of the second diameter forms a first and second shelf on opposing sides of said spiral channel.

26. A helical screw as in claim 25, further including means for attaching said upper section to a shaft.

27. A method of installing an apparatus for supporting the trunk of a tree, comprising the steps of:
   a. positioning in a substantially vertical manner on the ground adjacent the tree trunk, a lower end of a telescoping elongated shaft, said lower end being adapted to facilitate rotational penetration into the ground;
   b. applying both rotational force and downward force to said shaft by means of a lever arm to provide a moment arm about a longitudinal axis of said shaft to rotationally implant said lower end of said shaft into the ground;
   c. extending said telescoping shaft to an appropriate height;
   d. securing a proximate end of a rigid fastening arm perpendicularly to said shaft and orienting a distal end of said arm toward the trunk of a tree, while maintaining said distal end of said arm in spaced relation from the tree trunk; and
   e. looping a flexible strap having one end connected to said distal end around the tree trunk and securing the other end of said strap to said distal end of said fastening arm, thereby loosely encompassing the tree trunk.

28. The method as in claim 27, further including the step of anchoring said shaft in the ground to resist vertical and rotational movement of said shaft.

29. The method as in claim 27, further including the step of securing a proximate end of a second fastening arm perpendicularly to said shaft and orienting a distal end of said second arm toward the trunk of a tree, while maintaining said distal end of said second arm in spaced relation from the tree trunk.

30. The method as in claim 29, further including the step of looping a second flexible strap, having one end connected to said distal end of said second fastening arm, around the tree trunk and securing the other end of said strap to said distal end of said second fastening arm, thereby loosely encompassing the tree trunk.

* * * * *